April 8, 1947. J. E. COLLINS 2,418,757
CAM STRUCTURE
Filed Sept. 15, 1944

INVENTOR.
JOHN E. COLLINS
BY Hyde and Meyer
ATTORNEYS.

Patented Apr. 8, 1947

2,418,757

UNITED STATES PATENT OFFICE 2,418,757

CAM STRUCTURE

John E. Collins, Akron, Ohio, assignor to The Sinclair-Collins Valve Company, Akron, Ohio, a corporation of Ohio Application September 15, 1944, Serial No. 554,195

1 Claim. (Cl. 74—568)

The invention relates to novel and improved cam structures. It particularly relates to novel and improved means for assembling, retaining and/or removing replaceable cam segments on a suitable operating support.

There are many instances in which it becomes desirable to vary the contour or timing of a cam so as to produce corresponding changes in machine operations controlled thereby. Variations may be required in the angle of cam rise or drop, or in the circumferential extent of a particular cam track characteristic. It may be desirable to make these changes rapidly, without disassembling major portions of a mechanical assembly. One such instance occurs in the operation of a sequence controller which controls a plurality of operations of a complex machine such as a pressure die casting machine. One such controller is illustrated and described, for example, in my co-pending application, Serial No. 552,975, filed September 7, 1944.

Obviously, as the specific character of the operation performed by such machine must change from one job to the next, it becomes necessary to shorten or lengthen the work cycle, and/or to vary the time intervals between the successive operations of the machine. Valves may need to be opened or closed slowly or rapidly at various points in the cycle. The need accordingly arises for a cam structure, or a multiplicity of such structures, wherein the cam track may be modified with ease and rapidity to vary a cyclic succession of operations.

Since however the inventive concept herein disclosed involves only a cam structure, and is not restricted to any specific application thereof, the illustration and description of the invention is concerned only with the operating elements of a single cam member, with fragmentary showing of such mechanism as is necessary for a thorough understanding of the invention. A complete operating unit, in the form of a sequence controller utilizing cam structures such as will now be described, is shown in my aforesaid co-pending application, Serial No. 552,975, filed September 7, 1944.

In the drawings which accompany this application and form a part thereof,

Figure 1:
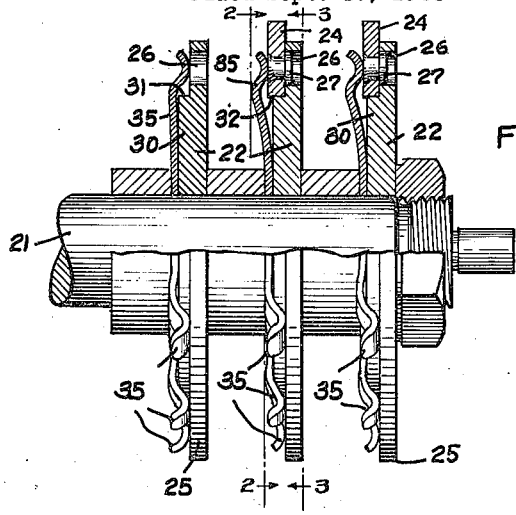
Fig. 1 is a view, partly in section and partly in side elevation, of a fragmentary portion of a cam shaft carrying cam structures embodying the present invention.
Figure 2:
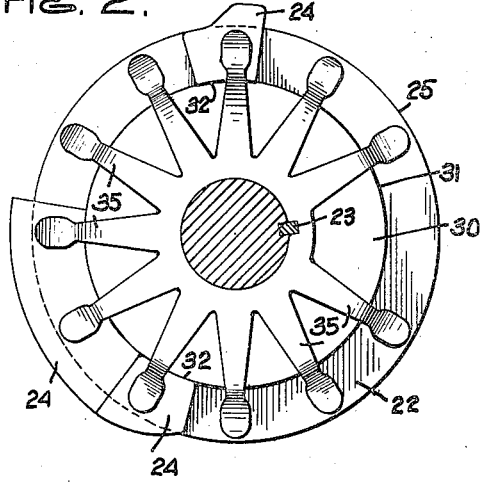
Fig. 2 is a sectional view taken on the line 2—2 of Fig. 1.
Figure 3:
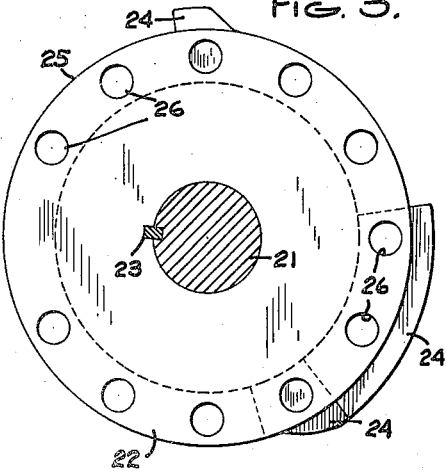
Fig. 3 is a sectional view taken on the line 3—3 of Fig. 1.

Fig. 1 shows a fragmentary portion of an operating cam shaft 21 rotatable either continuously or intermittently around its longitudinal axis by power means, not shown. Shaft 21 carries cam supporting means comprising in the present instance one or more cam supporting discs 22, centrally apertured to receive the shaft, and affixed thereto in any suitable manner, for example by a conventional key and slot arrangement 23. Each disc 22 is shown as having a circular periphery 25, and the invention here disclosed resides in the means for application to, and retention on, said disc of one or more cam segments 24, of suitable contour, which project radially outwardly beyond the peripheral edge of disc 22, and the outer surface of which in conjunction with the balance of the disk periphery 25 constitutes the complete cam track.

To suitably accommodate a plurality of such segments 24, the segments and the disc are provided with complementary retaining means, consisting of a projection on one member and a recess or aperture on the other. In the embodiment shown the disc 22 has a plurality of spaced apertures 26 disposed around the disc near its peripheral edge, and each segment 24 carries a projection 27 which has a snug sliding fit in any one of the apertures so that segments may be disposed at any desired location around the disk periphery.

Displacement or rocking of a segment is prevented by the following means. Spaced radially inwardly from its periphery, each disc 22 is provided with a laterally extending projecting portion 30, thereby affording a backing up shoulder or abutment 31 conforming in contour to the inwardly disposed edge 32 of the cam segment 24 when the projection 27 is seated in the aperture 26. This shoulder not only prevents rocking of the segment on the potential pivot point 27, but it also provides an abutment to sustain the inward thrust of a cam follower (not shown).

I have provided displaceable means, normally resiliently biased to retain the segments 24 in lapped engagement with discs 22, but readily disengageable manually so as to permit segments to be mounted on, or removed from, the disc. Such means comprises a spring element carried in juxtaposition to said disk, and biased to urge the segment 24 against the disk. In the embodiment of the invention here illustrated the spring means is shown as a spider having a plurality of spring fingers 35 radiating from a central hub 36, the hub being pierced to receive the cam shaft 21, and being keyed thereon in conventional fashion to prevent rotary displacement. It may be observed that the number of spring fingers 35 corresponds to the number of apertures 26, so that sufficient spring fingers are available even for the maximum complement of cam segments. The spring pressure exerted as indicated is ample to retain a cam segment in operating position since the operating load on the segment is applied radially, and is supported by shoulder 31.

In applying a cam segment 24, the end of the finger 35 is withdrawn from the disc 22 by slight manual effort, and the segment is easily slipped into operative position with its rear edge resting on shoulder 31, and with projection 27 seated in aperture 26. The finger 35 is then permitted to snap into operative position against segment 24.

Figure 4:
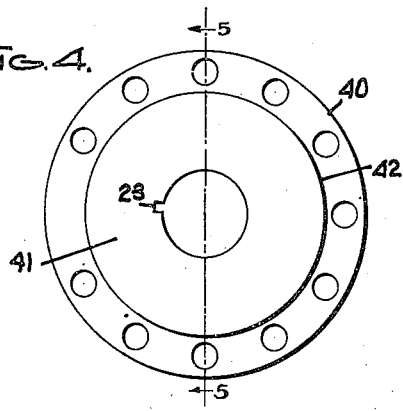
Fig. 4 is a plan view of a somewhat modified embodiment of supporting disc for the cam segments.
Figure 5:
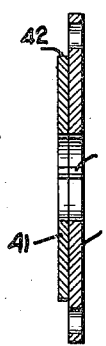
Fig. 5 is a section taken on the line 5—5 of Fig. 4.

For convenience in fabrication, the cam supporting disc 22 may be assembled from two separately formed members 40 and 41 (Figs. 4 and 5) of different diameters, thereby affording a shoulder or abutment 42 corresponding to the shoulder 31 of the embodiment shown in Fig. 1.

When a change is required in the operational sequence controlled by one or more cam assemblies of the nature just described, such as the addition or elimination of an operation, or a variation in the length of the periods during or between successive operations, it takes only a moment for the operator to make the desired changes in the proper cam tracks in the manner just described. The potential number of segments on one disc may of course be increased or reduced, and the circumferential extent, in degrees, occupied by any segment is a matter of choice, on consideration of the individual requirements of the operating cycle.

What I claim is:

A cam structure comprising a pair of supporting discs superposed and axially aligned, one of said discs being of larger diameter than the other so as to provide an annular face portion on the larger disc extending radially beyond the peripheral edge of the smaller disc, and said peripheral edge of said smaller disc providing an annular shoulder spaced radially inwardly from the peripheral edge of the larger disc, a plurality of cam segments removably seated around said annular face portion of said larger disc each such segment having an inner edge portion in abutment with said annular shoulder and having a portion projecting radially outwardly beyond the peripheral edge of said larger disc, spring means for retaining said segments in predisposed position around the periphery of said larger disc comprising a spider element disposed adjacent said smaller disc, and having a central hub coaxial with both said discs, and a plurality of spring fingers radiating from said hub, each such spring finger being adapted to operatively engage a respective segment, whereby such engaged segment is maintained in said predisposed position, and complementary interfitting means on said larger disc and on each of said segments said complementary means consisting of a series of bored apertures peripherally disposed adjacent the outer edge of said larger disc, but spaced inwardly from said outer edge, each said segment having a projection extending laterally therefrom, and seatable in a respective aperture for establishing the position of each said segment with respect to said larger disc.

JOHN E. COLLINS.

REFERENCES CITED

The following references are of record in the file of this patent:

UNITED STATES PATENTS

| Number | Name | Date |
|---|---|---|
| 2,255,012 | Lake et al. | Sept. 2, 1941 |
| 53,857 | Orndorff | Apr. 10, 1866 |

FOREIGN PATENTS

| Number | Country | Date |
|---|---|---|
| 555,648 | British | Sept. 1, 1943 |